United States Patent [19]

Haraguchi et al.

[11] Patent Number: 4,979,205

[45] Date of Patent: Dec. 18, 1990

[54] CORDLESS TELEPHONE

[75] Inventors: Shinya Haraguchi; Kiyonori Nakahara, both of Tokyo, Japan

[73] Assignee: Sony Corporation, Tokyo, Japan

[21] Appl. No.: 327,239

[22] Filed: Mar. 22, 1989

[30] Foreign Application Priority Data

Mar. 23, 1988 [JP] Japan .................................. 63-68725

[51] Int. Cl.$^5$ ............................................. H04Q 7/04
[52] U.S. Cl. ......................................... 379/61; 379/62
[58] Field of Search ........................ 379/61, 62, 58, 56

[56] References Cited

U.S. PATENT DOCUMENTS 4,656,653  4/1987  Oda et al. ............................... 379/61
4,700,375  10/1987  Reed ...................................... 379/61
4,893,155  6/1986  Hawkins .............................. 379/61

Primary Examiner—Jin F. NG
Assistant Examiner—William D. Cumming
Attorney, Agent, or Firm—Lewis H. Eslinger

[57] ABSTRACT

A cordless telephone includes a base unit connected to a telephone network line and a handset unit having a rechargeable battery for its operating power supply. The handset unit and the base unit are connected through a communication channel by radio waves during a telephone communication. An identification code is transmitted from one of the units to the other prior to a communication between the two units. The identification code transmitted by one unit is examined in the other unit, and a communication channel is established between the two units only when the transmitted identification code is determined be correct. The handset has a first recharge detecting circuit for detecting a recharge of the rechargeable battery and a first memory for storing the identification code, and the base unit has a recharging circuit for recharging the rechargeable battery, a second recharge detecting circuit for detecting a recharge of the rechargeable battery by the recharging circuit, and a second memory for storing the identification code. When the first recharge detecting circuit detects a recharge of the rechargeable battery, the identification code stored in the second memory is extracted through recharging contacts of the handset unit and the base unit, and the identification code thus extracted is recorded in the first memory.

7 Claims, 9 Drawing Sheets

CORDLESS TELEPHONE

BACKGROUND OF THE INVENTION

1. Field of the Invention

This invention relates to a cordless telephone and, more particularly, to a cordless telephone including novel means for transferring an identification code from a memory in a base unit to a memory in a handset unit of the cordless telephone during recharging of a rechargeable battery in the handset unit.

2. Description of the Prior Art

A telephone system including cordless telephones has been proposed and put into service in Japan, the United States of America and other countries.

A cordless telephone, as shown in FIG. 1, comprises a transmitter-receiver constituting a handset unit 1 and a transmitter-receiver constituting a base unit 2. The base unit 2 is connected to a telephone network line 3. The base unit 2 and the handset 1 communicate with each other by radio waves. Accordingly, a telephone subscriber who has a cordless telephone can make outgoing calls and receive incoming calls through the handset unit 1 just as he can through an ordinary telephone.

The cordless telephone as described above can provide a service radius, that is, the distance by which the handset unit 1 can be separated from the base unit 2 while making telephone calls, of approximately 300 meters. The frequency of the radio waves transmitted between the handset unit 1 and the base unit 2 is regulated to be in a 49 MHz band in the up channel (i.e., in the case of transmission from the handset 1 to the base 2) and in a 46 MHz band in the down channel (i.e., in the case of transmission from the base 2 to the handset 1), and ten duplex channels are permitted for each system in the United States.

Therefore, the subscriber can take the handset unit 1 anywhere, e.g. outdoors, while making and receiving telephone calls. Further, the cordless telephone does not involve the inconvenience inherent in an ordinary telephone because of its telephone cord, which may become twisted and cumbersome.

However, since signal transmission between the handset unit 1 and the base unit 2 is via radio waves, the conversation of a subscriber in a telephone call made through his own handset unit 1 and base unit 2 may be tapped by an unauthorized third party using another cordless telephone nearby.

To avoid such a problem, a practical cordless telephone is provided with an identification code (ID code) for the handset unit 1 and the base unit 2. Specifically, a handset unit 1 and base unit 2 that are intended to be used together are both provided with the same ID code, which is selected, for example, from binary code values represented by 20 bits.

When a communication is initiated between the handset unit 1 and the base unit 2, the ID code is transmitted from one unit to the other, and the unit receiving the transmission determines whether or not the received ID code is the same as the ID code previously stored therein. If the transmitted and previously stored ID codes are identical, a communication channel is established thereafter, and accordingly the subscriber is placed in telephone communication with a called or calling party. However, if the ID codes are not identical, the establishment of the communication channel is prevented.

FIG. 2 is a block diagram of the overall arrangement of a typical handset unit 1 of the cordless telephone which employs the above-mentioned ID code. The handset unit 1 includes a transmitting circuit 110 and a receiving circuit 120.

FIG. 3 is a block diagram of the overall arrangement of a typical base unit 2 which includes a transmitting circuit 210 and a receiving circuit 220.

In a process of making an outgoing call, an audio signal St from a microphone 111 is supplied through signal processing circuits including a low frequency amplifier 112, a low pass filter 113 and an adder circuit 114, arranged in that order, to a voltage-controlled oscillator or VCO (not shown) of a phase locked loop (PLL) 115 wherein the signal St is converted to a frequency modulated (FM) signal Su of the up channel. The FM signal Su is supplied through signal processing circuits including a bandpass filter 116 having a pass band which permits all of the up channels to pass therethrough, a high frequency power amplifier 117 and a duplexer 118, arranged in that order, to an antenna 100 through which the FM signal Su is transmitted to the base unit 2.

As FIG. 3 shows, the signal (radio wave) Su transmitted from the handset unit 1 is received at the base unit 2 by an antenna 200 and supplied through signal processing circuits including a duplexer 218, a high frequency amplifier 221 and a bandpass filter 222 having a pass band which permits all of the up channels to pass therethrough, arranged in that order, to a mixing circuit 223. The mixing circuit 223 is also supplied with a local oscillation signal with a predetermined frequency from a PLL 224 and hence the signal Su is converted to an intermediate frequency signal. This intermediate frequency signal is supplied through an intermediate frequency amplifier 225 to an FM demodulating circuit 226, wherein it is demodulated to the audio signal St. The audio signal St is then delivered to the telephone network line 3 through signal processing circuits including a low frequency amplifier 227, a two-line to four-line converting circuit 231, and a relay contact 232.

When an incoming call is received from the telephone network line 3, an audio signal Sr from the telephone network line 3 is similarly processed and supplied to a receiving circuit 120 of the handset unit 1. More specifically the audio signal Sr from the telephone network line 3 is supplied through signal processing circuits including the relay contact 232, the converting circuit 231, a low frequency amplifier 212, a low pass filter 213 and the adder circuit 214, arranged in that order, to a VCO (not shown) of a PLL 215, wherein the signal Sr is converted to an FM signal Sd in the down channel which pairs up with the FM signal Su in the up channel. The signal Sd is supplied through a bandpass filter 216 having a pass band which permits all of the down channels to pass therethrough, a high frequency power amplifier 217 and the duplexer 218, arranged in that order, to the antenna 200, through which the signal Sd is transmitted to the handset unit 1.

In FIG. 2, the signal Sd from the base unit 2 is received by the antenna 100 of the handset unit 1 and supplied through the duplexer 118, a high frequency amplifier 121 and a bandpass filter 122 having a pass band which permits all of the down channels to pass therethrough, arranged in that order, to a mixing circuit 123. The mixing circuit 123 is also supplied with a local oscillation signal with a predetermined frequency from a PLL 124, so that the signal Sd is converted to an intermediate frequency signal. This intermediate frequency signal is supplied through an intermediate frequency amplifier 125 to an FM demodulating circuit 126, wherein it is demodulated to the audio signal Sr which in turn is supplied through a low frequency amplifier 127 to the speaker 128.

The handset unit 1 contains a control circuit 140 for controlling the communication channels and so on. The control circuit 140 is formed of a one-chip microcomputer which includes a central processing unit (CPU) 141 adapted, e.g., for 4-bit parallel processing, a read only memory (ROM) 142 which stores control programs for controlling the operation of the CPU 141, a random access memory (RAM) 143 for use as a work area, an input port 144 and an output port 145. The ROM 142 also stores a program 300 shown by a flow chart of FIG. 5.

The microcomputer 140 is coupled with a keyboard 151, a talk key 152 and a mode key 153. The keyboard 151 is provided with nonlocking type push switches for keying in a desired telephone number. It has ten keys respectively representing digits 0-9 plus star and number keys. The talk key 152 and the mode key 153 are adapted to change the operating modes of the handset unit 1. The talk key 152 employs a nonlocking type push switch, and the mode key 153 a locking type sliding switch.

Every time the talk key 152 is depressed, the operating mode of the handset unit 1 is alternately changed over between a "talk mode," which establishes a channel to the base unit 2 and accordingly permits a telephone call, and a "standby mode," which closes the channel and sets the handset unit 1 into a standby mode. In the standby mode, if the mode key 153 is placed in a "normal position" (as shown in FIG. 2), the base unit 2 waits for an outgoing call made by the handset unit 1 and for reception of a call from the network line 3. If the mode key 153 is placed in a "restricted" position (the opposite of the state shown in FIG. 2), the base unit 2 waits only for an outgoing call made by means of the handset unit 1 and ignores any call that may come in from the network line 3. In other words, the mode key 153 in the normal position enables the completion of outgoing and incoming calls in the same manner as ordinary cordless telephones and standard telephones, but in the restricted position enables the completion of outgoing calls only. Depression of the talk key 152 when the handset unit 1 is in the standby mode sets the handset unit 1 into the talk mode, which enables the completion of both incoming and outgoing telephone calls regardless of the position of the mode key 153. When the talk key is again depressed, the handset unit 1 returns to the normal or restricted standby mode it was in before the telephone call was made, as determined by the position of the mode key 153.

A random access memory (RAM) 154 stores an identification code ID, later referred to.

In the handset 1, an encoder 161 (FIG. 2) controlled by the microcomputer 140 generates a command signal CMND. Similarly, in the base unit 2, an encoder 251 (FIG. 3) controlled by the microcomputer 240 generates a command signal CMND.

FIG. 4 shows an example of a signal format by which the command signal CMND is constructed. The command signal CMND has at the head thereof a bit synchronizing signal BSYN of more than 12 bits (16 bits in this example) and, subsequent thereto, a frame synchronizing signal FSYN of 16 bits. These signals BSYN and FSYN respectively have a particular bit pattern, for example, as follows:

BSYN="0101010101010101" for all channels;
FSYN="1100010011010110" for the up channels; and
FSYN="1001001100110110" for the down channels.

The command signal CMND further has subsequent to the signal FSYN a 25-bit identification code ID for identifying the handset unit 1 and the base unit 2 which form a pair, a 12-bit error correcting code ECC for the identification code ID, and an 88-bit control code CTRL, arranged in that order. The control code CTRL includes a code for controlling the opening and closing of the communication channel between the handset unit 1 and the base unit 2, a code indicating the fact of transmission of the telephone number of counterpart apparatus (i.e., apparatus of another subscriber), a code representing the transmitted telephone number thereof and so on. The control code CTRL includes data indicative of the kind of control (operation code) and data (operand) necessary to the control. For example, when a channel is to be opened, the control code CTRL comprises data formed in a first bit pattern and dummy data, and when a telephone number of the counterpart is transmitted, the control code CTRL comprises data formed in a second bit pattern and data relative to the telephone number thereof.

In the command signal CMND, the synchronizing signals BSYN and FSYN employ non-return-to-zero (NRZ) signals, and the identification code ID, the error correcting code ECC and the control code CTRL employ split phase signals (Manchester code) converted from the NRZ signals. The transmitting speed of the signal CMND is set, for example, at 1200 bps.

When the command signal CMND is formed, it is supplied through the adder circuit 114 (FIG. 2) to the PLL 115, so that the signal Su is FM modulated using frequency shift keying (FSK) by the command signal CMND.

A squelch detecting circuit 162 is connected to the intermediate frequency amplifier 125 for detecting the presence or the absence of the FM signal Sd from the intermediate frequency signal level. A squelch signal SQLC generated thereby is supplied to the microcomputer 140.

Further, a decoder 163, which corresponds to the encoder 161, is connected to the demodulating circuit 126 for extracting the command signal CMND transmitted from the base unit 2. The extracted command signal CMND is supplied to the microcomputer 140.

A ring tone signal generating circuit 165, controlled by the microcomputer 140, generates a ring tone signal when a telephone call is received. The ring tone signal is supplied to a speaker 166 of a bell ringer.

The microcomputer 140 supplies the PLLs 115 and 124 with a signal CHNL for specifying a channel and the PLL 115 with a signal TXEN for controlling transmission of the FM signal Su. The microcomputer 140 further supplies the amplifiers 112 and 127 with a muting signal MUTE.

A light emitting diode (LED) 167 and an LED unit 168 are controlled by the microcomputer 140. The LED 167 is lit when the handset unit 1 is set in the talk mode. The LED unit 168 forms a display mounted on the front panel of the handset unit 1 and includes, for example, ten LEDs, disposed linearly and corresponding to the number of channels. These LEDs are lit in response to channel selection, data supplied as an input from the keyboard 151 and so on.

In FIG. 3, a control circuit 240 is constructed in substantially the same manner as the control circuit 140 of the handset unit 1 and has generally the same functions. The components 241-245 of the control circuit 240 corresponding to those 141-145 of the control circuit 140 have the same two final digits in the reference numeral while the first digit is replaced by "2". Therefore, the explanation of these elements 241-245 will be omitted. One exception is that the ROM 242 stores, for example, a program 400 as shown in FIG. 5.

Further, A RAM 254 and circuits 261-263 are similar to the RAM 154 and the circuits 161-163 of the handset unit 1 and also signals processed by these components of the base unit 2 are similar to those processed by the corresponding components of the handset unit 1, so that the explanation thereof will be also omitted.

A telephone number signal generating circuit 265, controlled by the microcomputer 240, generates a tone encode signal TENC corresponding to a telephone number to which the subscriber is going to make an outgoing call. The signal TENC is supplied to the amplifier 227.

A relay 266, controlled by the microcomputer 240 through an amplifier 267, controls a relay contact 232.

A ring tone detecting circuit 268 is connected to the telephone network line 3 to detect a ring tone signal indicative of an incoming call and generate a detecting signal RGTN which is supplied to the microcomputer 240.

The operations of the handset unit 1 and the base unit 2 are respectively controlled by the CPUs 141 and 241 in accordance with the programs 300 and 400 as shown in FIG. 5 in the following manner:

First, when the handset unit 1 is in the standby mode, step 301 is executed to check the positions of the talk key 152 and the mode key 153. At this time, if the mode key 153 is placed in the normal mode, the step 302 is also executed, whereby the PLLs 115 and 124 are controlled by the signal CHNL to set the up and down channels corresponding to the signal CHNL, and an examination is made by the detector 162 to determine whether or not the FM signal Sd is received on a first selected down channel and to supply the appropriate signal SQLC on the basis of the determination. If the signal Sd is not received on the selected channel, the same operations are repeated with respect to the next down channel. Thus, it is determined whether the FM down signal Sd is received on any of the ten down channels by sequentially and repeatedly changing the down channels. The down channels are thus repeatedly scanned at step 302.

On the other hand, when the base unit 2 is in the standby mode, the presence or absence of an incoming call from the telephone network cable 3 is examined by the signal RGTN at step 401. Next, at step 402 the up channels are repeatedly scanned just as the down channels are scanned at step 302.

When the talk key 152 of the handset unit 1 is depressed at an arbitrary time, the handset program 300 proceeds to step 303, wherein a vacant channel is searched for by means of the signals CHNL and SQLC in the same manner as in step 301.

When a vacant channel is found, transmission of the FM signal Su is enabled by the signal TXEN at step 304. Next, at step 305, an identification code ID is read out from the RAM 154 and supplied to the encoder 161.

The encoder 161 is also supplied from the microcomputer 140 with the control code CTRL indicative of an outgoing call. From the encoder 161, the command signal CMND having the control code corresponding to the outgoing call is extracted and supplied to the adder circuit 114. Therefore, at step 306 the command signal CMND is transmitted to the base unit 2 by the FM signal Su.

The transmission of the command signal CMND at step 306, assuming that no response is returned from the base unit 2, is repeated for a period in which all the channels are scanned at least once in the base unit 2.

As indicated above, the base unit 2, in the standby mode, sequentially scans all the up channels at step 402. When one of the up channels through which the handset unit 1 is transmitting the command signal CMND is found in the scanning operation, the signal Su is received by the base unit 2 and detected by the signal SQLC, whereby the program proceeds to step 405 to stop the scanning and determines the identification code ID in the signal CMND.

If the identification code ID is not coincident with that in the RAM 254, the program 400 loops back to step 402. If coincidence is found, the program proceeds to step 406, wherein the transmission of the FM signal Sd is enabled by the signal TXEN. Next, at step 407, the command signal CMND is generated in the same manner as at step 305. At step 408, the command signal CMND is then transmitted back to the handset unit 1 by the FM signal Sd in the down channel which forms a pair with the up channel in use. The control code CTRL in the returned command signal CMND is the same as that in the command signal CMND generated at step 305. In other words, the control code CTRL set at step 305 is echoed back by the command signal CMND.

Meanwhile, the handset unit 1, having formed and transmitted the command signal CMND at step 306, examines at step 307 whether or not the correct identification code ID is transmitted back thereto by means of the output signal from the decoder 163. Practically, the steps 305, 306 and 307 are alternately and repeatedly executed by the program 300 in a time-division multiplex fashion until all the channels have been scanned in the base unit 2 or until the return of the correct identification code ID is confirmed.

If it is determined at step 307 that the correct identification code ID has not been returned from the base unit 2, the program 300 loops back to step 302. When it is confirmed at step 307 that the correct identification code ID has been returned from the base unit 2, the program 300 proceeds to step 308, wherein the amplifiers 112 and 127 are released from the muting condition established by the signal MUTE and an acknowledgement code for acknowledging the echo back of the control code CTRL at step 407 is generated and incorporated in the command signal CMND. The latter signal is transmitted to the base unit 2 at step 309.

In the base unit 2, the presence of the acknowledgement code is confirmed at step 409, whereby the relay 266 is driven to connect the converting circuit 231 with the telephone network line 3 through the contact 232, and the amplifiers 212 and 227 are released from the muting condition established by the signal MUTE.

Thus, the handset unit 1 is connected through the base unit 2 to the telephone network line 3.

When the subscriber keys in the first digit of a desired telephone number by means of the keyboard 151 of the handset 1, the control signal CTRL portion of the command signal CMND includes a code indicative of the existence of a telephone number and data relative to the first digit of the telephone number. A command signal CMND including this information is extracted by the encoder 161 at step 311 and transmitted to the base unit 2 at step 312.

In the base unit 2, it is determined at step 411 whether or not the identification code ID in the command signal CMND generated at step 311 is correct. If the identification code ID is not correct, the program 400 loops back to step 402. If the identification code ID is correct, the program proceeds to steps 412 and 413, wherein the command signal CMND generated at step 311 is echoed back to the handset unit 1.

Next, in the handset unit 1, it is determined at step 313 whether or not the identification code ID and the control code CTRL (the code indicative of the existence of a telephone number and the digits of the number) contained in the command signal CMND echoed back from the base unit 2 are the same as those generated at step 311. If they are different, the program 300 loops back to step 311. If they are the same, the command signal CMND having the control code CTRL indicating the equality is generated at step 314 and transmitted to the base unit 2 at step 315.

Then, the base unit 2 generates at step 414 a tone encoded signal TENC corresponding to the first digit of the keyed-in telephone number from the generating circuit 265, under the control of the microcomputer 240, on the basis of the data relative to the telephone number included in the command signal CMND transmitted from the handset unit 1 at step 312, or on the basis of the first digit of the telephone number in this particular case. The signal TENC is delivered through the amplifier 227, the converting circuit 231 and the relay contact 232 to the telephone network line 3.

Steps 311-315 and 411-414 are repeated every time the subscriber keys in another digit of the telephone number of a counterpart subscriber by means of the keyboard 151.

By transmission of the signal TENC, the counterpart subscriber is called up. When he answers the call, communication is enabled as described above. This is indicated by the legend "Telephone Talking Condition" in FIG. 5B.

On the other hand, when a telephone call comes in from the network 3, the incoming call is detected at step 401, and subsequently operations corresponding to steps 304 to 309 are carried out in the base unit 2, while operations corresponding to steps 405 to 409 are carried out in the handset unit 1, whereby communication is enabled.

During the communication, the handset unit 1 repeatedly checks the mode of the talk key 152 at step 321, while the base unit 2 repeatedly examines at step 421 whether or not the identification code ID is present and whether or not it is correct.

When the talk key 152 is depressed in the handset unit 1 at the termination of the communication, the program 300 proceeds to step 322, wherein the amplifiers 112 and 127 are set into the muting condition by means of the signal MUTE and the command signal CMND including the control code CTRL having a communication termination code indicating the termination of a communication is extracted by the encoder 161 and transmitted to the base unit 2 at step 323. When this command signal CMND is received by the base unit 2, it is determined at step 421 whether or not the identification code ID in the command signal CMND is correct.

If the identification code ID is correct, the command signal CMND used at step 322 is echoed back to the handset unit 1 at steps 422 and 423.

Then, in the handset unit 1, it is determined at step 324 whether or not the identification code ID in the command signal CMND echoed back thereto is correct. If the identification code ID is correct, the command signal CMND indicative of acknowledgement of the echoed back command signal CMND is generated at step 325 and transmitted to the base unit 2 at step 326.

In the base unit 2, if the command signal CMND is acknowledged at step 424, the program 400 proceeds to step 425 wherein the transmission of the FM signal Sd is interrupted by means of the signal TXEN and the amplifiers 212 and 227 are set into the muting condition by means of the signal MUTE. Next, at step 426 the relay contact 232 is disconnected or opened and the base unit 2 is set into an on-hook condition. Thereafter, the program 400 returns to step 401.

In the handset unit 1, at step 327 after the command signal CMND is transmitted to the base unit 2 at step 326, the transmission of the FM signal Su is interrupted by means of the signal TXEN and the amplifiers 112 and 127 are set into the muting condition by means of the signal MUTE. Then, the program 300 returns to step 301.

By the above-mentioned process, the handset unit 1 and the base unit 2 are set back to the standby mode.

The foregoing is an explanation of the basic construction and operation of a conventional cordless telephone employing an identification code ID.

In such a cordless telephone, if the identification code ID of the handset unit 1 is identical to that of the base unit 2, a communication channel is established and accordingly the subscriber can make a telephone call, whereas if they are not identical, the communication channel is not established, thereby avoiding problems such as eavesdropping on, or tapping of, the conversation by unauthorized third parties.

However, a cordless telephone employing an identification code ID may experience problems in the circuit for setting the identification code ID.

Specifically, the handset unit 1 is naturally a cordless type and is provided with a built-in dry battery which serves as a power supply. Even when the handset unit 1 is not employed to make a telephone call, a part of its circuits such as the control circuit 140 or the like is energized and operated. For this reason, if an ordinary dry battery is employed as the power supply of the handset unit 1, the cost for the power supply will be extremely high. Therefore, a rechargeable battery such as a nickel-cadmium battery is employed as the power supply, so that when the battery is exhausted, the handset 1 is seated in a predetermined position as shown in FIG. 6 on the base unit 2 to recharge the battery built into the handset unit 1.

If the identification code ID is stored in the RAM 154 in the handset unit 1, then, when the battery is run down, the identification code ID will be lost, since the memory 154 is volatile.

Thus, when the battery in the handset unit 1 runs down or when a subscriber buys a cordless telephone, it is necessary to transmit the identification code ID from the base unit 2 to the handset unit 1 for a re-storing or updating of the same in the RAM 154.

A cordless telephone disclosed in Japanese patent publication No. 62-26937 (corresponding to Japanese patent application No. 60-166107) is intended to solve the above-mentioned problem by providing for the setting of the handset unit 1 on the base unit 2 as shown in FIG. 6. This cordless telephone is characterized by the following features:

(i) A recharging current is supplied from the base unit 2 to the handset unit 1 through recharging contacts (terminals);

(ii) The identification code ID is transmitted from the base unit 2 to the handset unit 1 through a terminal separately provided for that purpose;

(iii) The handset unit 1, when it receives the identification code ID, stores the same in the memory and returns the received identification code ID to the base unit 2 through a communication channel; and (iv) The base unit 2 examines the returned identification code ID to determine whether it is the same as the identification code ID transmitted to the handset unit 1.

Thus it is necessary that the base unit 2 and the handset unit 1 of this cordless telephone be respectively provided with two recharging terminals and one ID code terminal, including common terminals.

Of course, as the number of terminals is increased, a reduction in the size of the base unit 2 and handset unit 1 becomes more difficult. On top of that, if plural pairs of terminals are provided, it is not to be expected that all of the pairs of terminals will be held in contact with their respective counterparts by equal contact pressures. It is even possible that, owing to normal manufacturing tolerances, some of the terminal pairs will be subject to a contact pressure that is insufficient to ensure a reliable contact. From a probabilistic standpoint, as the number of terminal pairs is increased, the number of bad contacts that lie out of the tolerable range is naturally increased.

OBJECTS AND SUMMARY OF THE INVENTION

An object of the present invention is to provide a cordless telephone that does not need a separate terminal for communicating the identification code ID thereto, and accordingly has a decreased number of terminals.

Another object of the present invention is to provide a cordless telephone that can be reduced in size corresponding to the decreased number of terminals.

Another object of the present invention is to provide a cordless telephone that is less likely than conventional cordless telephones to malfunction when the identification code ID is supplied from the base unit to the handset unit for storage in a memory disposed in the handset unit.

The foregoing and other objects are attained in accordance with the invention by the provision of a cordless telephone comprising a base unit connected to a telephone network line and a handset unit connected to the base unit through a communication channel by radio waves when a telephone communication is made, at least one of the handset unit and the base unit including means for transmitting an identification code from the one unit to the other prior to a communication between the handset unit and the base unit, and at least the other unit including means for determining whether or not the transmitted identification code is correct and means responsive to a determination that the transmitted identification code is correct for establishing a communication channel between the handset unit and the base unit; the handset unit comprising: rechargeable means for powering the handset unit; a first recharging contact; a first recharge detecting circuit connected to the rechargeable means and the first recharging contact for detecting a recharge of the rechargeable means; and first memory means for storing the identification code; the base unit comprising: a power supply for powering the base unit; a second recharging contact for making contact with the first recharging contact; a recharging circuit connected to the power supply and the second recharging contact for recharging the rechargeable means; a second recharge detecting circuit for detecting a recharge of the rechargeable means by the recharging circuit; second memory means for storing the identification code; and means responsive to detection by the second recharge detecting circuit of a recharge of the rechargeable means for controlling the recharging current in accordance with the identification code, whereby the identification code is transmitted from the base unit to the handset unit, through the first and second recharging contacts; and the handset unit further comprising means responsive to detection by the first recharge detecting circuit of a recharge of the rechargeable means for extracting the identification code transmitted through the first and second contacts and for writing the extracted identification code in the first memory means.

These and other objects, features and advantages of the present invention will become apparent from the following detailed description of the preferred embodiment thereof taken in conjunction with the accompanying drawings, throughout which like reference numerals designate like elements and parts.

DESCRIPTION OF THE PREFERRED EMBODIMENT

A preferred embodiment of the present invention will hereinafter be described with reference to FIG. 7, among others.

Figure 7:
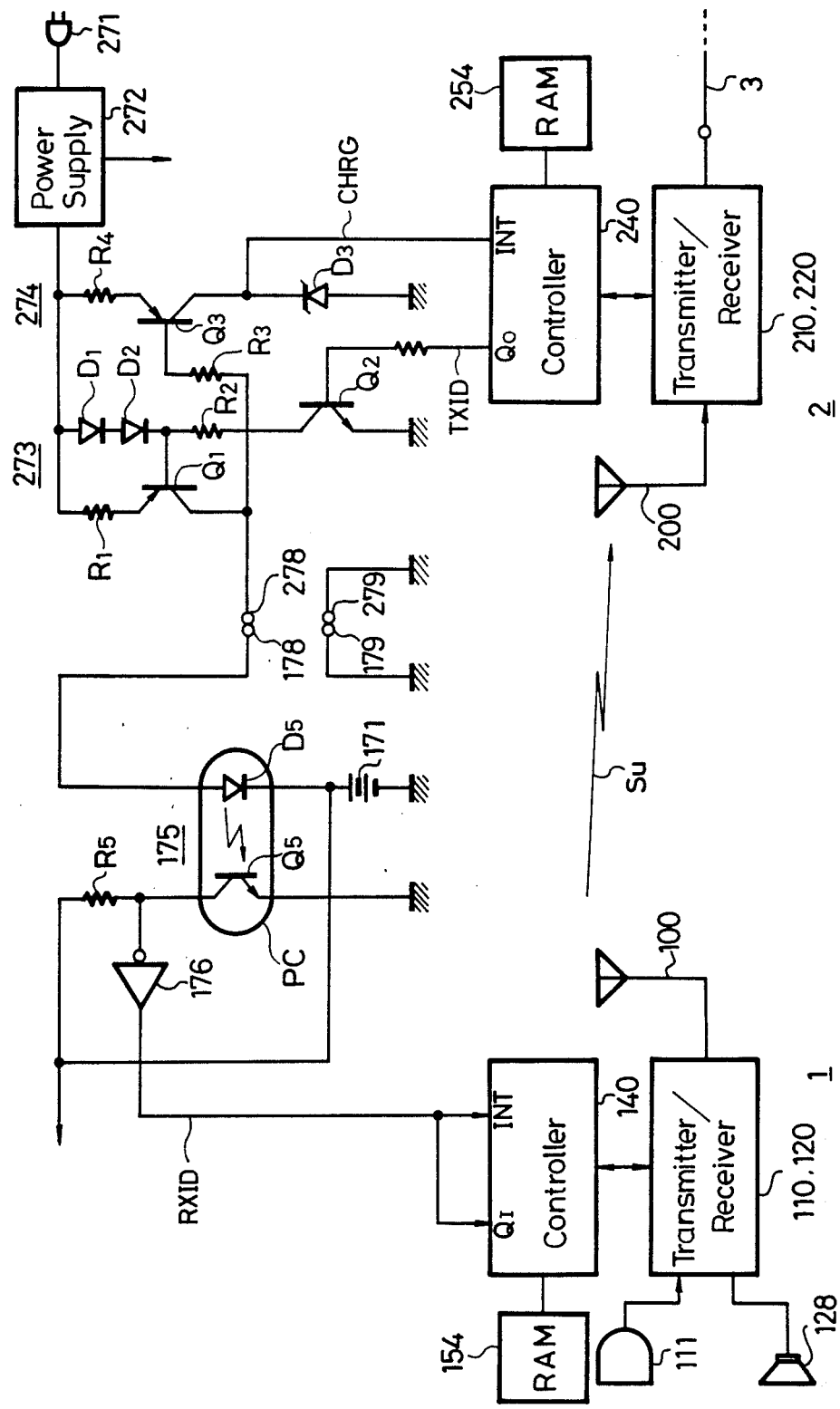
FIG. 7 is a schematic circuit diagram showing the overall arrangement of an embodiment of the present invention.

In the base unit 2 shown in FIG. 7, a power supply circuit 272, which includes a power supply transformer, a rectifier circuit and so on, is supplied with a commercial AC voltage through a power supply plug 271 and converts the same to a predetermined DC voltage. The DC voltage thus derived is applied to each part of the base unit 2 as its operating voltage, as well as to a recharging voltage output contact 278 through a recharging circuit 273.

The recharging circuit 273 is formed, for example, of transistors $Q_1$ and $Q_2$. Specifically, between the output terminal of the power supply circuit 272 and the contact 278, a resistor $R_1$ and the emitter and collector of the transistor $Q_1$ are connected in series, while diodes $D_1$ and $D_2$, a resistor $R_2$ and the collector and the emitter of the transistor $Q_2$ are connected in series between the output terminal of the power supply circuit 272 and ground. The base of the transistor $Q_1$ is connected to the connecting point of the diode $D_2$ and the resistor $R_2$, and the base of the transistor $Q_2$ is supplied through a resistor $R_6$ with a control signal (port output) TXID from a control circuit 240. The signal TXID is normally at a high ("H") level and is set to a level equal to a command signal having a predetermined control code CTRL when the identification code ID stored in a memory of the handset unit 1 is updated or confirmed.

A recharging voltage detecting circuit 274 is arranged between the output of the power supply circuit 272 and ground, wherein a resistor $R_4$, the emitter and the collector of a transistor $Q_3$, and a voltage regulating diode $D_3$ are connected in series. The base of the transistor $Q_3$ is connected through a resistor $R_3$ to the collector of the transistor $Q_1$. The collector output CHRG of the transistor $Q_3$ is supplied to an interrupt input INT of the control circuit 240 (employing a microcomputer, for example, $\mu$PD75104 made by NEC corporation). A contact 279 is a common contact connected to ground.

In the handset unit 1, a low impedance rechargeable battery 171, for example, a nickel-cadmium battery, applies its output voltage to each part of the handset unit 1 as its operating voltage. A recharging voltage input contact 178 is connected through a light emitting diode (LED) $D_5$ of a photocoupler PC to the battery 171.

A photocoupler PC is included in a detecting circuit 175. Between the positive terminal of the battery 171 and the ground, a resistor $R_5$ and the collector and the emitter of a phototransistor $Q_5$ of the photocoupler PC are connected in series. The collector output from the transistor $Q_5$ is inverted by an inverter 176, and the inverted output RXID therefrom is supplied to an interrupt input INT of a control circuit 140 (employing a microcomputer, for example, $\mu$PD75108 made by NEC) as well as to a terminal $Q_I$ as a port input.

The contact 178 and a common contact 179 in the handset unit 1 are disposed at a location such that they make contact with the contacts 278 and 279, respectively, in the base unit 2 when the battery 171 is recharged.

Figure 1:
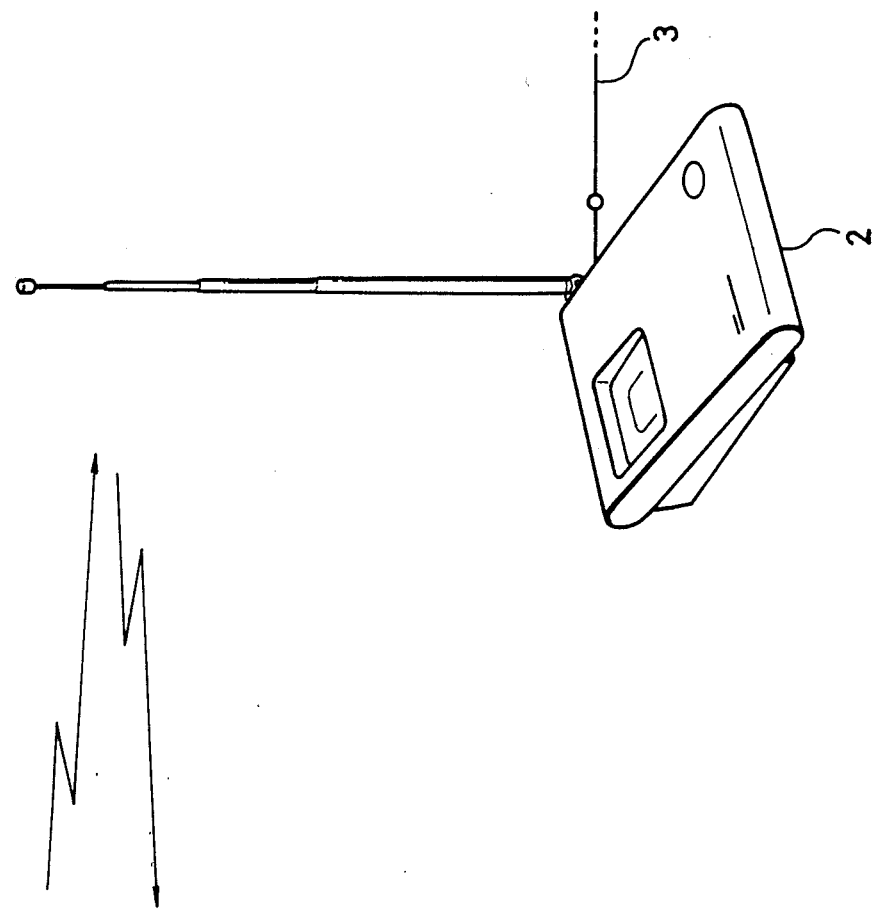
FIG. 1 is a perspective view illustrating the operation of a handset and base unit in accordance with the invention.
Figure 2:
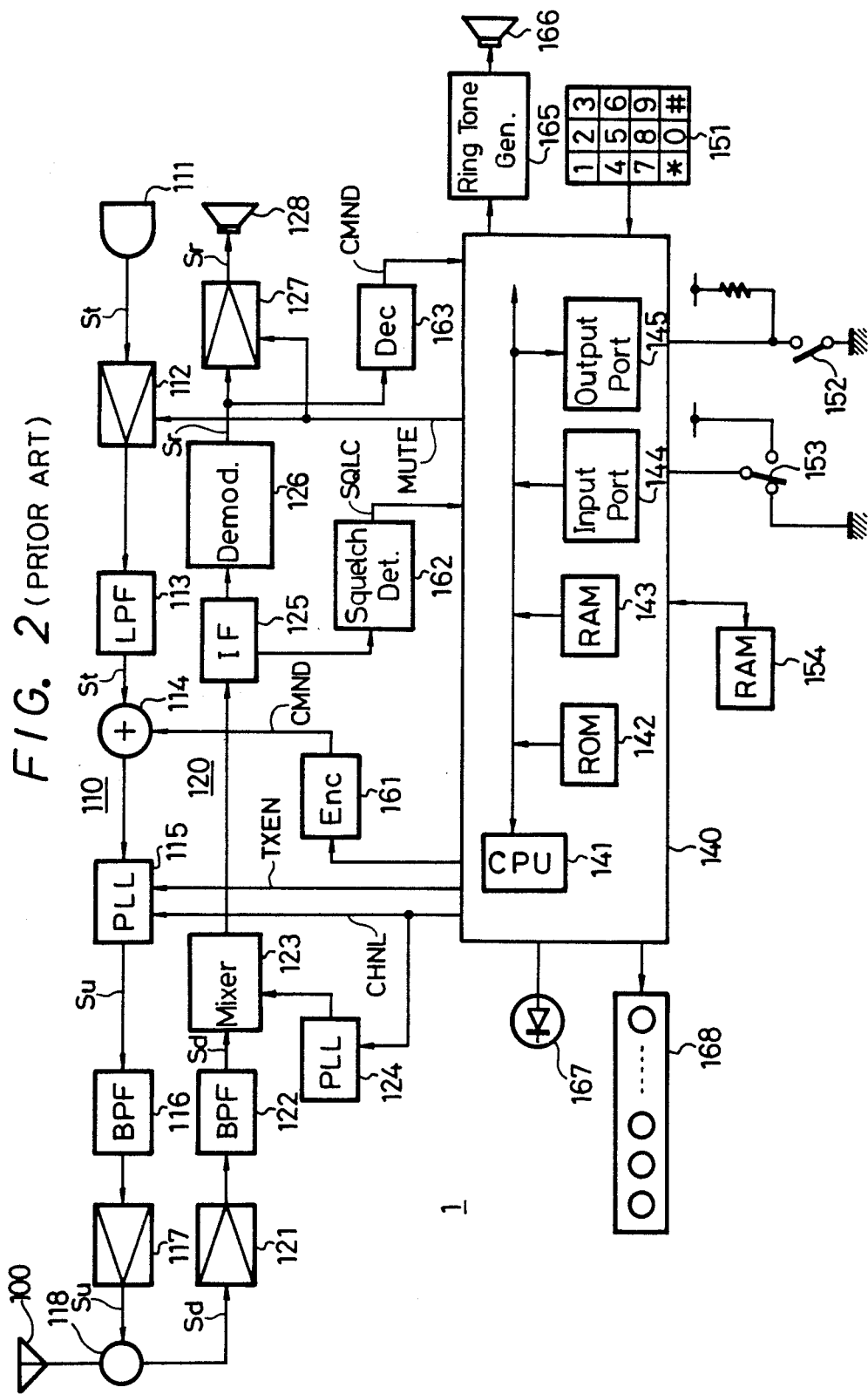
FIG. 2 is a block circuit diagram showing the overall arrangement of a handset unit of a conventional cordless telephone.
Figure 3:
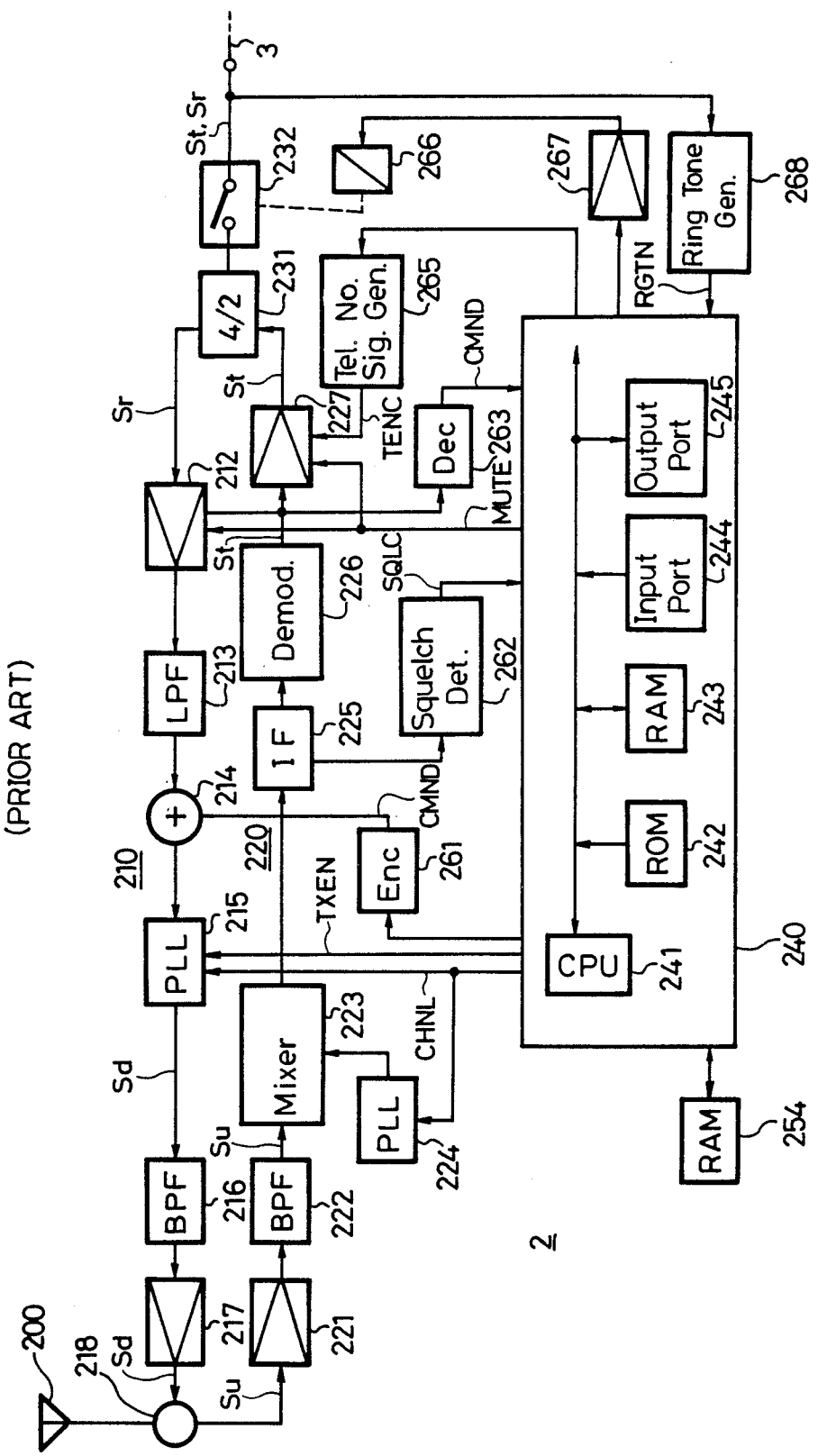
FIG. 3 is a block circuit diagram showing the overall arrangement of a base unit of a conventional cordless telephone.
Figure 4:
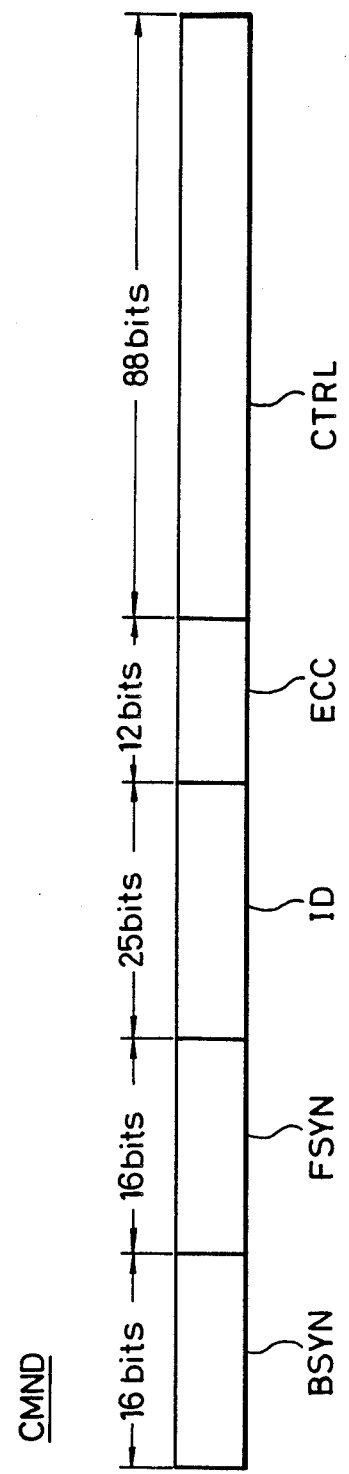
FIG. 4 is a diagram showing a signal format that can be used in accordance with the invention.
Figure 5A:
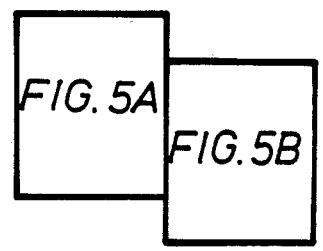
FIGS. 5A and 5B, are flow chart showing a sequence of operations performed by the conventional handset unit and the base unit.
Figure 5A:
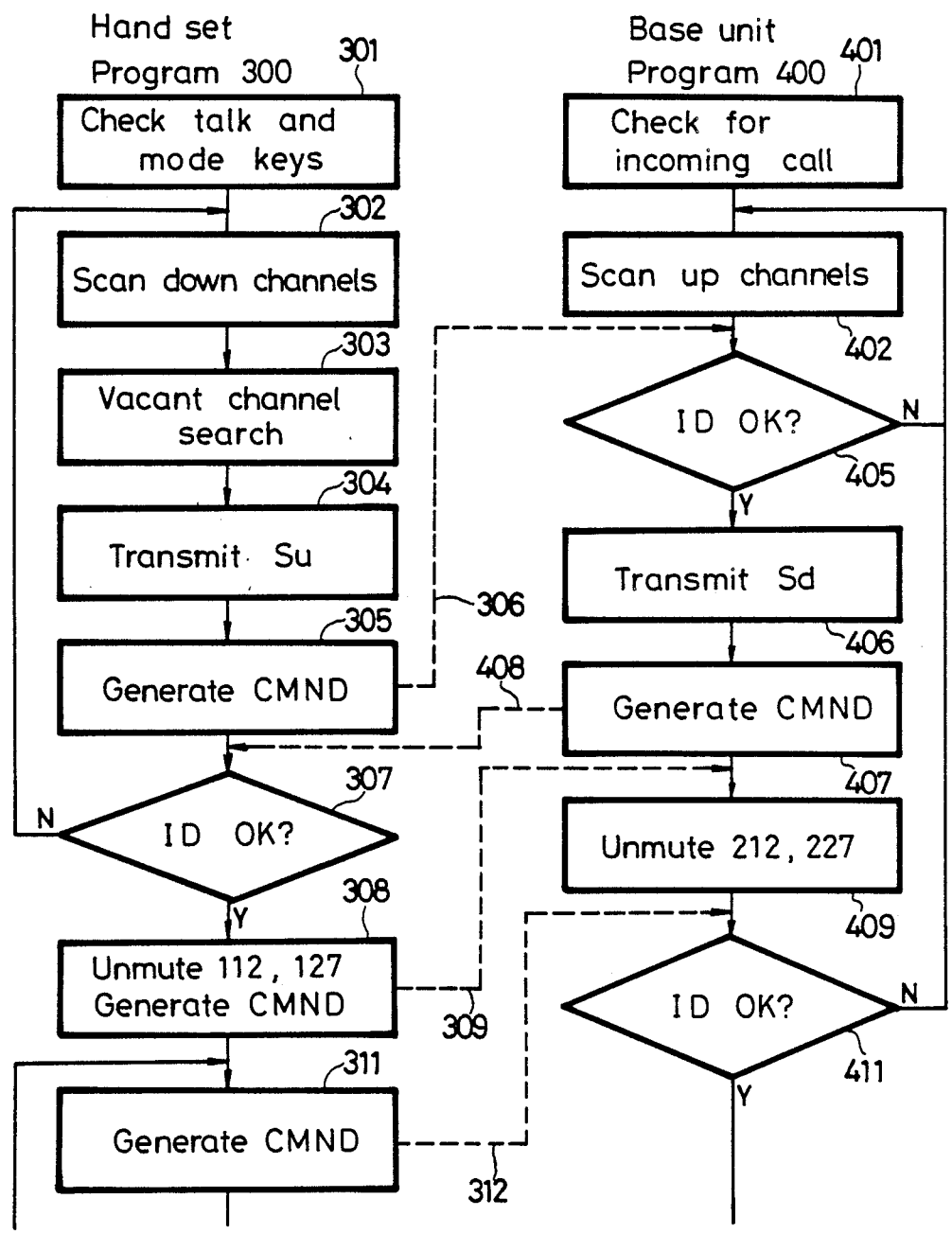
Figure 5B:
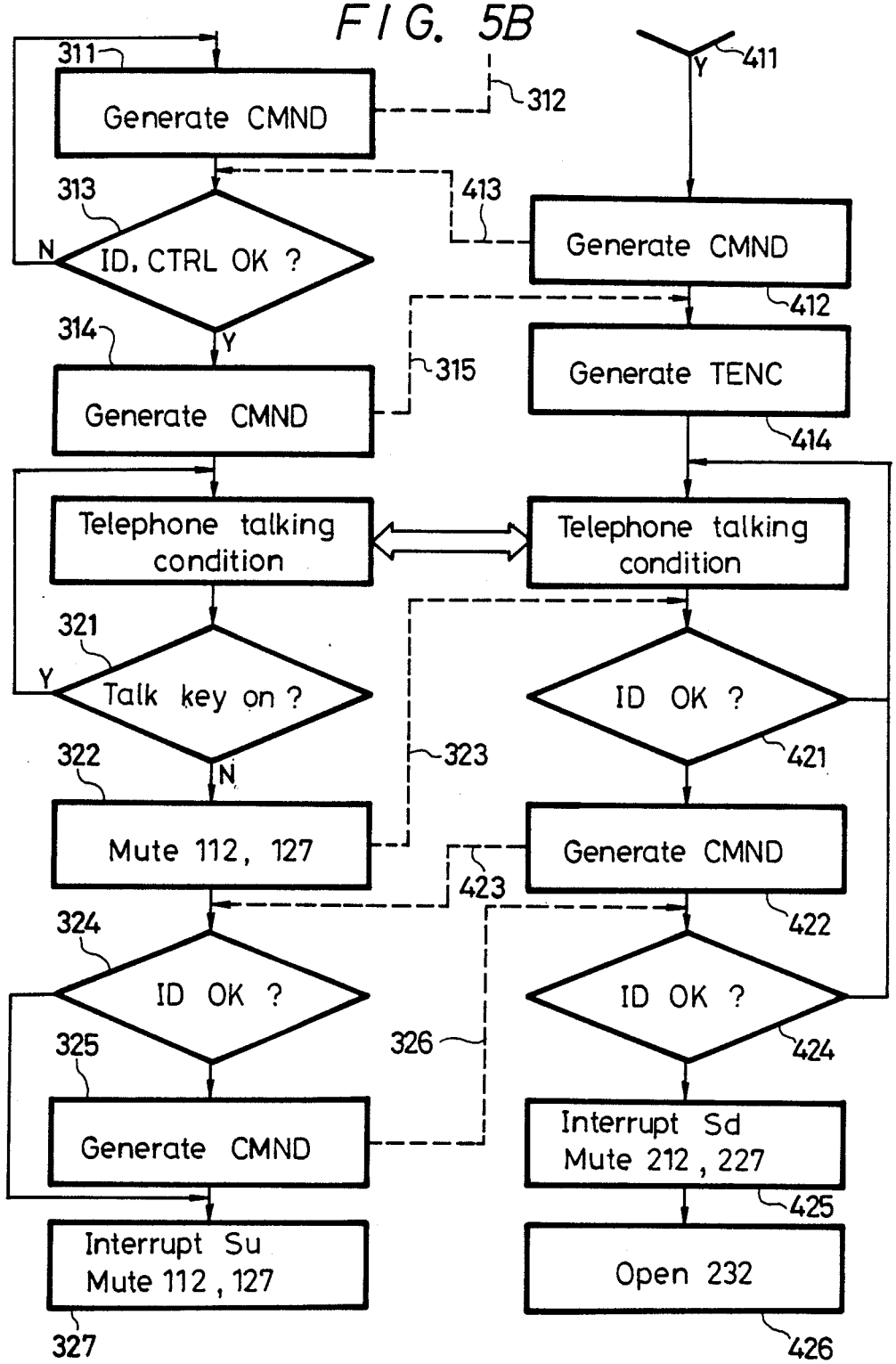
Figure 8:
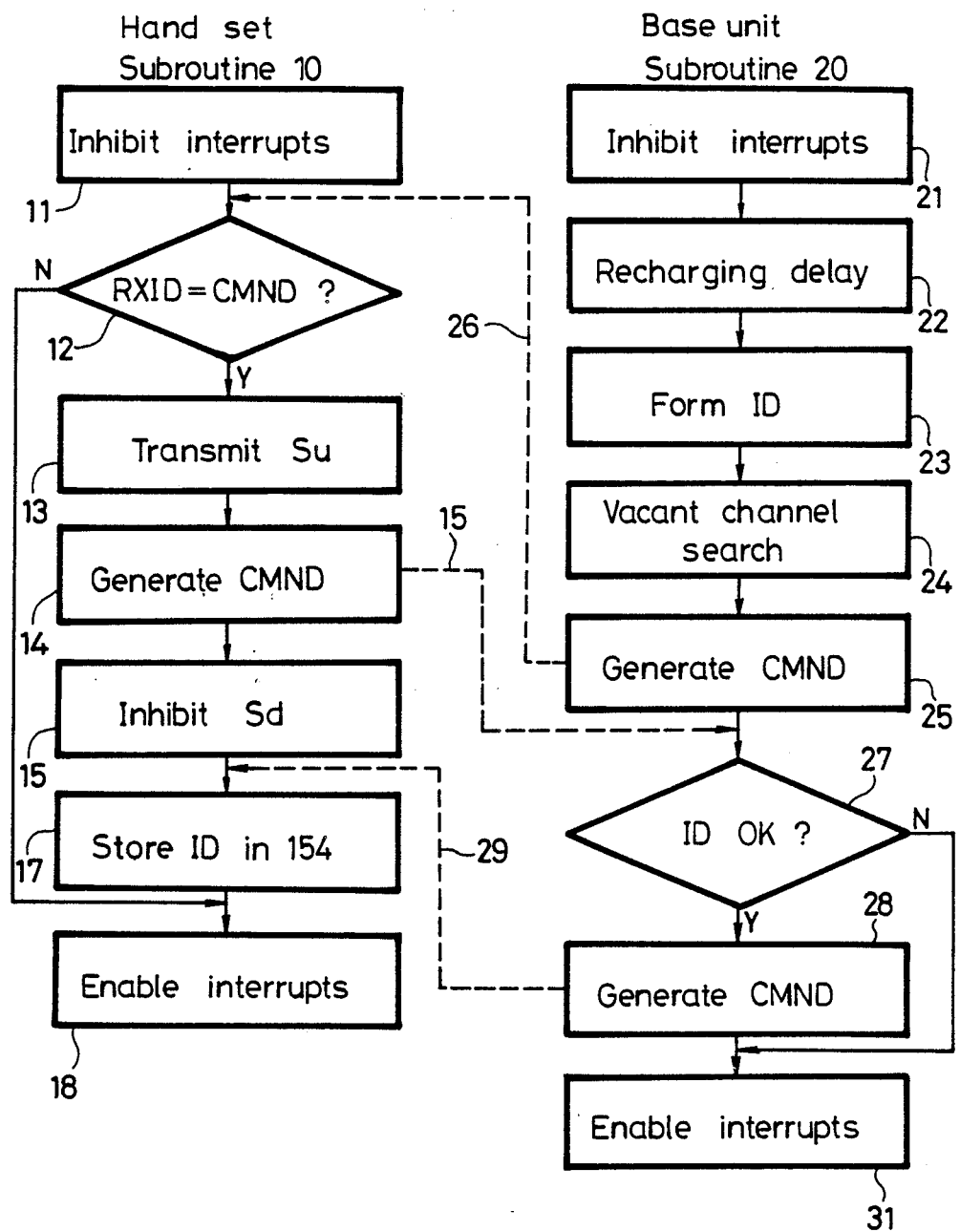
FIG. 8 is a flow chart showing a sequence of operations performed by the embodiment of the present invention shown in FIG. 7.

The ROM 142 (refer to FIG. 2) of the control circuit 140 in the handset unit 1 stores an interrupt subroutine 10 shown in FIG. 8, while the ROM 242 (refer to FIG. 3) of the control circuit 240 in the base unit 2 stores an interrupt subroutine 20 also shown in FIG. 8.

With the construction as described above, when the handset unit 1 is not seated on the base unit 2, the contact 278 is open so that the collector current of the transistor $Q_1$ will never flow regardless of the signal TXID. Therefore, the transistor $Q_3$ is in an off condition and the collector output CHRG is at a low ("L") level. When the collector output CHRG is at level "L", it will not interrupt the control circuit 240 even if it is supplied to the interrupt terminal INT.

Moreover, since the contact 178 is also open when the handset unit 1 is not seated on the base unit 2, the LED $D_5$ is not then lit and accordingly the transistor $Q_5$ is in an off condition and the inverted signal RXID is at level "L". Therefore, the control circuit 140 is not interrupted either.

Thus, in this case, the handset unit 1 and the base unit 2 are both in a condition such that the subscriber is able to make an outgoing call and receive an incoming call, that is, communicate through the cordless telephone.

Figure 6:
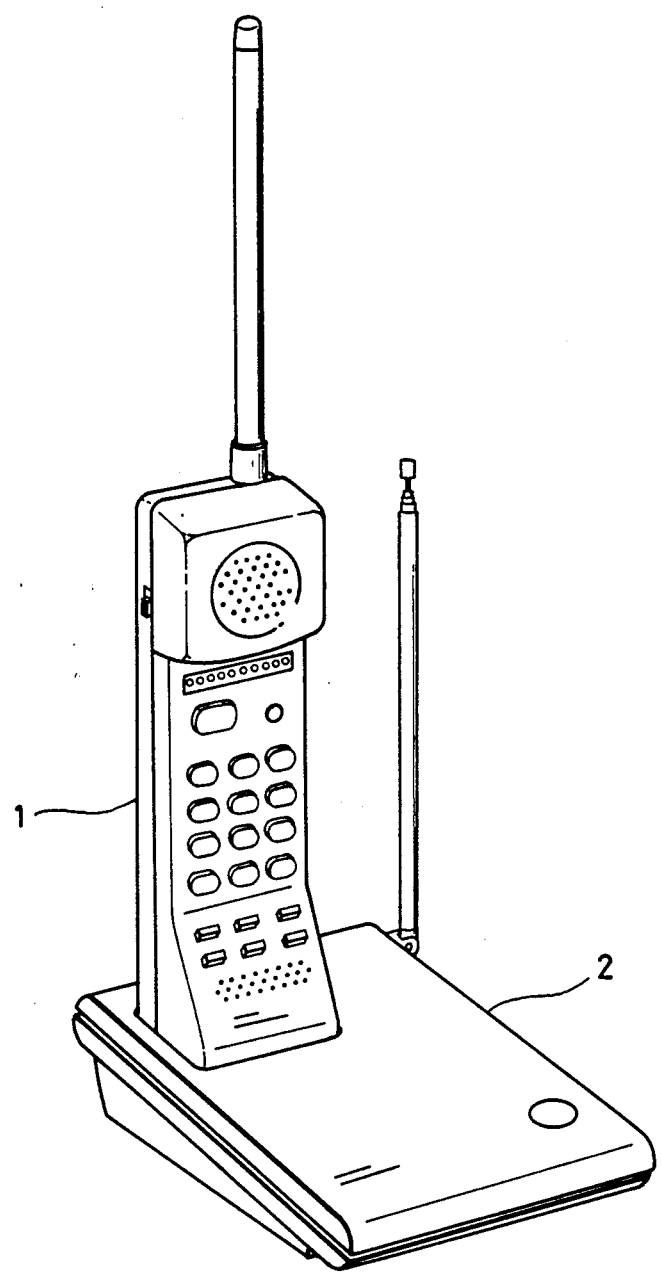
FIG. 6 is a perspective view of apparatus according to the invention illustrating a state where the handset unit is seated on the base unit for recharging the battery.

However, when the handset unit 1 is seated in the predetermined position on the base unit 2, as shown in FIG. 6, for recharging the battery 171, the contacts 178 and 179 make contact respectively with the contacts 278 and 279 as shown in FIG. 7.

Then, since the control signal TXID goes to a high level, the transistor $Q_2$ is turned on and thereby the transistor $Q_1$ is also turned on. Therefore, the collector current from the transistor $Q_1$ flows through the contact 278, the contact 178 and the LED $D_5$ to the battery 171 which is thus recharged by the regulated, constant collector current from the transistor $Q_1$.

When the collector current flows in the transistor $Q_1$, the transistor $Q_3$ is correspondingly turned on, whereby the signal CHRG goes to a high level to interrupt the control circuit 240.

When the control circuit 240 is interrupted, the CPU 241 (refer to FIG. 3) of the control circuit 240 starts a process of the subroutine 20 from step 21 (refer to FIG. 8) to inhibit subsequent interrupts. Next, at step 22, the operation of the base unit 2 is delayed for a predetermined period. The delay provided at step 22 is such that the subsequent operation of the base unit 2 is delayed until the recharging of the battery 171 has been completed and each part of the handset unit 1 can operated normally because of a floating recharge. Therefore, at the time the step 22 is terminated, each part of the handset unit 1 is already operating normally.

Next, the subroutine 20 executed by the CPU 241 proceeds to step 23, wherein a new identification code ID is formed on the basis of, for example, random numbers and stored in the RAM 254. At step 24, a vacant channel is searched for, in the same manner as at step 303. When a vacant channel is found, the command signal CMND is generated at step 25. In this event, the control code CTRL contained in the command signal CMND includes data indicating a transmission on the vacant channel and data relative to the number of the vacant channel found at step 24. The identification code ID in the command signal CMND is the one newly generated at step 23.

Next, at step 26, the command signal CMND generated at step 25 is supplied to the transistor $Q_2$ as the signal TXID. Therefore, the transistor $Q_2$ is on-off controlled by the command signal CMND generated at step 25 and supplied thereto, so that the recharging current for the battery 171 is also on-off controlled by the command signal CMND through the contacts 278 and 178.

Meanwhile, form the time the handset unit 1 is placed on the base unit 2, the recharging of the battery 171 begins, so that the LED $D_5$ is lit substantially immediately by the recharging current.

When the recharge develops enough to operated each part of the handset unit 1 normally, the lighting of the LED $D_5$ is detected by the transistor $Q_5$, so that the signal RXID goes high in level and is applied to the interrupt terminal INT of the control circuit 140 to interrupt the same.

When the control circuit 140 is interrupted by the signal RXID at level "H", the CPU 141 starts the process of a subroutine 10 shown in FIG. 8 from step 11, wherein subsequent interrupts are inhibited. Next, at step 12, the signal RXID supplied as a port input is taken in by the control circuit 140. In this event, the LED $D_5$ is supplied with the recharging current for the battery 171 and is on-off controlled by the command signal CMND transmitted at step 26, so that the signal RXID becomes the same as the command signal CMND. In other words, the command signal CMND is sent from the base unit 2 through the contacts 278 and 178 to the handset unit 1 and supplied to the control circuit 140 as the signal RXID.

If it is determined at step 12 that the signal RXID is the same as the command signal CMND, the transmission of the FM signal Su is enabled at step 13, and subsequently, at step 14, the identification code ID and the control code CTRL are extracted from the command signal CMND transmitted at step 26. Then, at step 15, this command signal CMND is echoed back to the base unit 2 by the FM signal Su through radio waves. The channel for transmitting the FM signal Su is selected from vacant channels on the basis of the vacant channel data transmitted at step 26 as part of the control code CTRL included in the command signal CMND.

When the command signal CMND is echoed back, the transmission of the FM signal Sd is inhibited at step 16.

The FM signal Su is received by the base unit 2, and it is determined at step 27 whether the identification code ID included in the command signal CMND echoed back by the FM signal Su at step 15 is the same as the identification code ID which was sent to the handset unit 1 at step 26; that is, it is determined whether the identification code ID was correctly sent back to the base unit 2. If it was correctly sent back, the command signal CMND indicative of acknowledgement of the ID code is generated at step 28 and transmitted to the handset unit 1 at step 29. The command signal generated at step 28 is sent by means of the signal TXID, in the same manner as the step 26, through the contacts 278 and 178.

When this command signal CMND is received by the handset unit 1, the identification code ID received at step 26 is stored in the RAM 154 at step 17. Next, the inhibition of interrupts established at step 11 is released at step 18, and then the subroutine 10 is terminated.

Also, the subroutine 20, after inhibition of the interrupts established at step 21 is released at step 31, is terminated.

If it is detected at step 27 that the identification code ID includes errors, the program jumps to step 31.

The battery 171 is recharged by the regulated constant current, and when a predetermined recharging period has elapsed, the signal TXID goes to a low level and consequently the transistor $Q_1$ is turned off, whereby the application of the recharging current to the battery 171 is stopped.

According to the present embodiment described above, when the handset unit 1 is seated on the base unit 2 for recharging the battery 171 of the handset unit 1, the identification code ID is updated or confirmed. In this event, a new identification code ID sent from the base unit 2 to the handset unit 1 is transmitted back from the handset unit 1 to the base unit 2 so that a determination can be made whether or not the new identification code ID supplied to the handset unit 1 is correct. In this way, apparatus constructed in accordance with the invention avoids storing an incorrect identification code ID in the memory of the handset unit 1.

It is noteworthy that the identification code ID is transmitted from the base unit 2 to the handset unit 1 through the recharging terminals 278 and 178, so that separate terminals for transmitting the identification code ID are not necessary and accordingly the number of terminals can be reduced. Also, by transmitting the identification code ID through the recharging terminals, easy and precise access to the identification code ID is provided.

In order to reduce the number of terminals still further, it might be considered to transmit the identification code ID through a communication channel. However, in this case, no saving results, since two pairs of contacts are necessary in any case in order to recharge the handset unit 1 through the base unit 2. Moreover, if there is another cordless telephone using the same channel nearby, such other cordless telephone may respond to the transmitted identification code ID, thereby resulting in failure to record the identification code ID in the intended handset and in improperly setting the identification code ID in the handset of the other cordless telephone.

In contrast, in accordance with the present invention, the identification code ID is transmitted from the base unit 2 to the handset unit 1 through the terminals 278 and 178, while it is retransmitted from the handset unit 1 to the base unit 2 through a communication channel. Further, the terminals for transmitting the identification code ID are also used as the recharging terminals 178 and 278, so that the required contacts are only two pairs: namely, the contacts 278, 178 and 279, 179, which are the same two pairs of contacts that are required in any case for recharging the battery 171. Thus the transfer of the identification code ID is stably and reliably carried out. Also, the communication channel is used only in order to return the identification code ID from the handset unit 1 to the base unit 2, so that the transmission of the identification code ID will not be influenced by other cordless telephones used nearby. The identification code ID is thus reliably returned from the handset unit 1 to the base unit 2.

The base unit 2 searches for a vacant channel and provides the handset unit 1 with data indicative of this vacant channel together with the identification code ID, while the handset unit 1 returns the identification code ID to the base unit 2 through this vacant channel. The identification code ID can be returned in a relatively short time, compared with a case where the handset unit 1 and the base unit 2 both search for a vacant channel to establish a communication channel, such as for making an outgoing call and receiving an incoming call.

Since the handset unit 1 returns the identification code ID through a vacant channel without fail, the transmission will not be interfered with by other radio waves. Also, the handset unit 1 does not need to transmit the FM signal Su more than is required for returning the identification code ID.

In a modification of the preferred embodiment of the invention described above, the identification code ID stored in the handset unit 1 is compared with the original identification code ID in the base unit 2 while the handset unit 1 is seated on the base unit 2, in substantially the manner disclosed above in connection with the subroutines 10 and 20. However, the original identification code ID in the base unit 2 is supplied again to the handset unit 1, and the handset unit 1 and the base unit 2 communicate with each other as described above only when there is a discrepancy between the identification code ID stored in the handset unit 1 and the original identification code ID in the base unit 2.

Also, the LED $D_5$ (FIG. 7) may be connected, for example, between the collector of the transistor $Q_1$ and the contact 278, the contact 178 may be connected directly with the battery 171, and the LED $D_5$ and the transistor $Q_5$ may be arranged so as to be optically coupled when the handset unit 1 is seated on the base unit 2.

The description given above is of a single preferred embodiment of the invention, but many modifications and variations can be effected by one skilled in the art without departing from the spirit or scope of the invention. Accordingly, the scope of the invention should be determined by the appended claims only.

We claim:

1. A cordless telephone comprising a base unit connected to a telephone network line and a handset unit connected to said base unit through a communication channel by radio waves when a telephone communication is made, at least one of said handset unit and said base unit including means for transmitting an identification code from said one unit to the other prior to a communication between said handset unit and said base unit, and at least said other unit including means for determining whether or not said transmitted identification code is correct and means responsive to a determination that said transmitted identification code is correct for establishing a communication channel between said handset unit and said base unit;

said handset unit comprising:

switch means for keying in a desired telephone number;

rechargeable means for powering said handset unit;

a first recharging contact;

a first recharge detecting circuit connected to said rechargeable means and said first recharging contact for detecting a recharge of said rechargeable means; and first memory means for storing said identification code;

said base unit comprising:

a power supply for powering said base unit;

a second recharging contact for making contact with said first recharging contact;

a recharging circuit connected to said power supply and said second recharging contact for recharging said rechargeable means;

a second recharge detecting circuit for detecting a recharge of said rechargeable means by said recharging circuit;

second memory means for storing said identification code; and means responsive to detection of said second recharge detecting circuit of a recharge of said rechargeable means for controlling said recharging current in accordance with said identification code, whereby said recharging current transmits said identification code from said bas unit to said handset unit through said first and second recharging contacts; and said handset unit further comprising means responsive to detection by said first recharge detecting circuit of a recharge of said rechargeable means for extracting said identification code transmitted through said first and second contacts and for writing said extracted identification code in said first memory means.

2. A cordless telephone according to claim 1 wherein said rechargeable means comprises a nickel-cadmium battery.

3. A cordless telephone according to claim 1 wherein, during said recharge of said rechargeable means, said base unit supports said handset unit and said first and second recharging contacts make contact with each other and, when said communication channel is established, said handset unit is separated from said base unit and said first recharging contact is separated from said second recharging contact.

4. A cordless telephone according to claim 1 wherein said first recharge detecting circuit comprises a photocoupler which is connected to said first recharging contact and turns on during said recharge and is otherwise off.

5. A cordless telephone according to claim 4 wherein said photocoupler comprises a light emitting diode which is connected to said recharging contact and turns on during said recharge and is otherwise off and a phototransistor which is mounted adjacent to said light emitting diode and turns on in response to light from said light emitting diode and is otherwise off.

6. A cordless telephone according to claim 1 wherein said first memory means comprises a random access memory.

7. A cordless telephone according to claim 1 wherein said recharging circuit comprises first and second transistors, said first transistor having an emitter and a collector connected in series with said power supply and said second recharging contact, and said second transistor produces an output for turning on said first transistor.

* * * * *

UNITED STATES PATENT AND TRADEMARK OFFICE
CERTIFICATE OF CORRECTION

PATENT NO. : 4,979,205
DATED : December 18, 1990
INVENTOR(S) : Shinya Haraguchi

It is certified that error appears in the above-identified patent and that said Letters Patent is hereby corrected as shown below:

On the title page, in References Cited, change

Patent No. "4,893,155" to 4,593,155--.

In the Abstract, Col. 2, line 10, after "determined"

insert --to--.

Col. 2, line 48, after "specifically" insert --,--

In the Claims:

Col. 16, line 11, change "bas" to --base--

Signed and Sealed this

Fourteenth Day of July, 1992

Attest:

DOUGLAS B. COMER

Attesting Officer

Acting Commissioner of Patents and Trademarks